Patented Nov. 3, 1936

2,059,842

UNITED STATES PATENT OFFICE 2,059,842

SYNTHETIC RESINOUS PRODUCT

William Baird and Rowland Hill, Manchester, England, assignors to Imperial Chemical Industries Limited, a corporation of Great Britain No Drawing. Application October 29, 1931, Serial No. 571,933. In Great Britain November 4, 1930

9 Claims. (Cl. 260—8)

This invention relates to synthetic resins and more particularly to oil modified polyhydric alcohol-polybasic acid resins.

This invention has as an object a new method for incorporating fatty oils into resinous polyhydric alcohol-polybasic acid condensation products. Other objects will appear hereinafter.

According to the present invention we obtain artificial resinous products consisting of or containing fatty oils or the constituent radicals of such oils, and polyhydric-alcohol-polycarboxylic-acid condensation products by a process comprising the following steps, namely: (1) a polyhydric-alcohol-polycarboxylic acid condensation product possessing free alcoholic groups is prepared either (a) by bringing about interaction between a polycarboxylic acid and a polyhydric alcohol in quantities such that at least half the hydroxyl groups of the polyhydric alcohol remain unsatisfied or (b) by treating an already formed polyhydric-alcohol-polycarboxylic-acid condensation product of the nature described below with a polyhydric alcohol in such a way as to effect chemical interaction; (2) a fatty oil is incorporated with the product of steps (1) by subjecting the mixture to heat; (3) the free alcohol groups are esterified by adding to the products of stage (2) either a polycarboxylic acid, or a mixture of a polycarboxylic acid and a monocarboxylic acid and subjecting the mixture to heat.

Inasmuch as the advantages of our process cannot be realized with polyhydric alcohol-polybasic acid condensation products made with equivalent proportions of the alcohol and acid, or with those condensation products made with the slight excess of polyhydric alcohol that has occurred incidentally or otherwise in manufacturing these resins, it is to be understood that the essential feature of our invention is the formation, by either step 1a or step 1b above, of a polyhydric alcohol-polybasic acid condensation product wherein at least one-half of the hydroxyl groups of the polyhydric alcohol are not esterified by an acid radical. For example, in the case of a polyhydric alcohol-polybasic acid condensation product made from a trihydric alcohol such as glycerol and a dibasic acid such as phthalic acid the molar ratio is at least 4 mols of glycerol to 3 mols of phthalic anhydride, in other words, the polyhydric alcohol should be used in at least one hundred per cent excess.

Of polyhydric alcohols used in the process of our invention we may mention glycerol, mannitol, sorbitol, pentaerythritol, triethanolamine, diglycerol, triglycerol, etc. While glycols, such as ethylene glycol, may be used to make resins by the present process, the advantages of our new process are less apparent when glycols are used because fatty oils may be usually incorporated without difficulty into polyhydric alcohol-polybasic acid resins made with these alcohols and it is not generally necessary to resort to a special method of incorporating the oil as is the case when polyhydric alcohols containing three or more hydroxyl groups are used. It is to be understood, therefore, that the reference to a polyhydric alcohol herein refers particularly to polyhydric alcohols containing at least three hydroxyl groups. We may, however, use mixtures of polyhydric alcohols. Of polycarboxylic acids we may mention phthalic, succinic, diphenic, adipic, sebasic, naphthalic, suberic, citric, trimesic and trimellitic. The acids may be used as anhydrides as is well understood. We do not, however, limit our invention to the use of these acids, nor to their use alone at any stage. Of fatty oils we may mention e. g. coconut oil, olive oil, linseed oil, manhaden oil, tung oil, soya bean oil, sunflower seed oil, perilla oil, rubber seed oil, chia oil, oiticica oil, etc. We do not include hydroxylated oils, such as castor oil, by the term "fatty oil" inasmuch as this oil and other hydroxylated oils can be incorporated into polyhydric alcohol-polybasic acid condensation products even though these are prepared from equivalent proportions of polyhydric alcohol and polybasic acid.

Touching step (1) of the process of our invention, we may say that it has not hitherto been disclosed that homogeneous polyhydric alcohol-polybasic (carboxylic) acid condensation products possessing unsatisfied alcoholic functions may be obtained by effecting interaction between a condensation product in the making of which approximately chemically equivalent proportions have been used, and a polyhydric alcohol. It is surprising, indeed, that, as we have found, a simple condensation product of the well known type will interact with a polyhydric alcohol, no matter whether the preliminary preparation of the simple condensation product has been carried to the A, B, or C stage (these stages being generally recognized as being A, when the substance is fusible and soluble, B when it is fusible but insoluble, and C when it is neither fusible nor soluble). It will be understood that at the end of step (1) the proportion of unsatisfied alcoholic function is preferably not less than about 50% of the total, and briefly it can be said that the product of this step is generally not capable of being carried to the B or C stage. It will be further understood that under conditions illustrated by one or more of the examples which follow, steps (1) and (2) may be combined. It will be further understood that to facilitate the interaction in step (2) we may add to the mixture any of the known alcoholysis catalysts such as calcium glycerate, acid calcium phthalate, sodium naphthionate.

Touching step (3) of the process of our invention we may say that any polybasic carboxylic acid previously used may be used here, either alone or together with a monobasic acid, among which we may mention the higher fatty acids, e. g. the fatty acids of fatty oils; aromatic acids, e. g. benzoic acid, cinnamic acid; and such acids of incompletely elucidated composition as abietic acid. To furnish the latter we may use, it will be understood, a natural resin, e. g. colophony. Other natural resins such as congo or damar may be added during or after this step (3). Also we may use more polybasic or other acid than is required to satisfy the alcoholic groups remaining in our product at this stage, and effect a balance by adding a suitable amount of an alcohol.

Generally the process of our invention permits us to obtain homogeneous polyhydric alcohol-polybasic acid resinous condensation products containing fatty oils in a simple way, but it has the advantage that our new products possess characteristic and valuable properties, which we believe to be due to the stepwise interaction of the polyhydric alcohol and the polybasic carboxylic acid.

Our invention is illustrated but not limited, by the following examples, in which the parts are by weight:

*Example I*

92 parts of glycerol and 74 parts (i. e. ⅓ chemical equivalent reckoned on the glycerol) of phthalic anhydride are heated at 200° with stirring for 2 hours and 140 parts of linseed oil are added. The temperature of the mixture is then raised to 285° and held there until the oil is homogeneously commingled. This process requires about 50 minutes. The product is cooled to 220°, 148 parts of phthalic anhydride are added and the mixture is heated at 195° until condensation is complete, i. e. for about 4 hours. The product is a tough moderately hard resin of a yellowish brown color.

*Example II*

30 parts of glycerol, 25 parts (i. e. about ⅓ chemical equivalent reckoned on the glycerol of phthalic anhydride) 87 parts of linseed oil and 56 parts of tung oil are heated at 280-290, with stirring, for 1 hour. The clear homogeneous product thus obtained is allowed to cool to 220°, 33 parts of phthalic anhydride are added and the condensation is completed by heating for 3 hours at 200-210°. The product is a soft, tough brown resin.

*Example III*

46 parts of glycerol, 37 parts (i. e. ⅓ chemical equivalent reckoned on the glycerol) of phthalic anhydride, and 134 parts of linseed oil are heated at 280-290° with stirring for 1 hour. The clear product obtained is allowed to cool, 46 parts of glycerol and 185 parts of phthalic anhydride are added and the condensation is completed by heating for 4½ hours at 195°.

*Example IV*

148 parts of glycerol phthalate condensation product, equivalent proportions having been used and having a drip point of 95° are heated with 43 parts of glycerol at 200° with stirring until the melt is homogeneous. 123 parts of linseed oil are added, the temperature is raised to 285° and is maintained there until the oil has been incorporated: this takes about 2 hours. The temperature is then allowed to fall to 220°, 101 parts of phthalic anhydride are added and the condensation is completed by heating for 2 hours at 195°.

*Example V*

A glycerol phthalate resin is prepared by heating together equivalent proportions, i. e. 74 parts of phthalic anhydride and 31 parts of glycerol, the condensation being completed by heating for 8 hours at 200° C. The product is then pulverized and to 75 parts are added 25 parts of glycerol, 118 parts linseed oil, and 0.1 part calcium glycerate. The mixture is heated at 260° C. until the mixture becomes homogeneous, i. e. about 3 hours, 60 parts of phthalic anhydride are now added and the heating continued at 240° C. for 1 hour.

The product is a clear tough moderately hard resin which readily dissolves in solvent naphtha.

As many apparently widely different embodiments of this invention may be made without departing from the spirit and scope thereof, it is to be understood that we do not limit ourselves to the specific embodiments thereof except as defined in the following claims:

We claim:

1. A process which comprises heating glycerol and phthalic anhydride in the ratio of at least 4 mols of glycerol to 3 mols of phthalic anhydride, heating the condensation product thus obtained with a non-hydroxylated fatty oil, then adding phthalic anhydride and heating until resinification is complete.

2. A process which comprises heating the soluble resinous condensation product of substantially equivalent proportions of polyhydric alcohol having at least three hydroxyl groups and polybasic carboxylic acid with polyhydric alcohol having at least three hydroxyl groups in proportions which leave at least one-half of the hydroxyl groups in the resulting condensation product not esterified by an acid radical, heating the product with a non-hydroxylated fatty oil, then adding a polybasic acid and heating until resinification is complete.

3. A process which comprises heating the soluble resinous condensation product of substantially equivalent proportions of polyhydric alcohol having at least three hydroxyl groups and polybasic carboxylic acid with a polyhydric alcohol having at least three hydroxyl groups and a non-hydroxylated fatty oil until a homogeneous product is obtained, the proportion of said last mentioned polyhydric alcohol being such that at least one-half of the hydroxyl groups in the condensation product are not esterified by an acid radical, and then heating the product with a polybasic acid until resinification is complete.

4. The process set forth in claim 2 in which the polyhydric alcohol is glycerol and the polybasic acid is phthalic anhydride.

5. The process set forth in claim 3 in which the polyhydric alcohol is glycerol and the polybasic acid is phthalic anhydride.

6. The process set forth in claim 1 in which the fatty oil is linseed oil.

7. A process which comprises heating a polycarboxylic acid with a polyhydric alcohol having at least three hydroxyl groups, the latter being present in at least twice the amount necessary to esterify the polybasic acid, heating this product with a non-hydroxylated fatty oil until a homogeneous mixture is obtained, then adding additional polycarboxylic acid thereto and heating to complete the resinification.

8. A process which comprises heating a non-hydroxylated fatty oil with a polycarboxylic acid and a polyhydric alcohol having at least three hydroxyl groups in at least twice the amount necessary to esterify the acid until a homogeneous mixture is obtained, then adding additional polycarboxylic acid and heating to complete the resinification.

9. The process set forth in claim 8 in which the polyhydric alcohol is glycerol and the polybasic acid is phthalic anhydride.

WILLIAM BAIRD.
ROWLAND HILL.